United States Patent [19]
Koopmann et al.

[11] 3,877,346

[45] Apr. 15, 1975

[54] ELECTRO-HYDRAULIC ACTUATION SYSTEM WITH REDUNDANCY OPERATION, SUPERVISION AND EMERGENCY OPERATION

[75] Inventors: Hans-Jürgen Koopmann; Eike Schmidt, both of Bremen, Germany

[73] Assignee: Vereinigte Flugtechnische Werke-Fokker GmbH, Bremen, Germany

[22] Filed: Mar. 25, 1974

[21] Appl. No.: 454,235

[30] Foreign Application Priority Data
Mar. 30, 1973 Germany.......................... 2315906

[52] U.S. Cl.................... 91/411 R; 60/403; 60/404; 244/77 M
[51] Int. Cl....................... F15b 11/16; F15b 20/00
[58] Field of Search............. 91/411 R; 60/403, 404, 60/DIG. 2; 244/77 M

[56] References Cited
UNITED STATES PATENTS

| | | | |
|---|---|---|---|
| 3,286,600 | 10/1966 | Colburn | 91/411 R |
| 3,426,650 | 2/1969 | Jenney | 91/411 R X |
| 3,488,029 | 1/1970 | Durbin | 91/411 R X |

*Primary Examiner*—Edgar W. Geoghegan
*Attorney, Agent, or Firm*—Ralf H. Siegemund

[57] ABSTRACT

A control system for aircraft has a control member e.g. nozzle, air foil etc provided for being controlled by a redundant, i.e. multiple unit actuation system. Each unit is separately supervised through simulation, and in the case of drop out of all units, a standby unit of similar construction is operatively connected to the control member to provide actuation thereof. The stand-by unit runs along as far as electrical inputs is concerned and takes over when the redundant system as failed.

6 Claims, 1 Drawing Figure

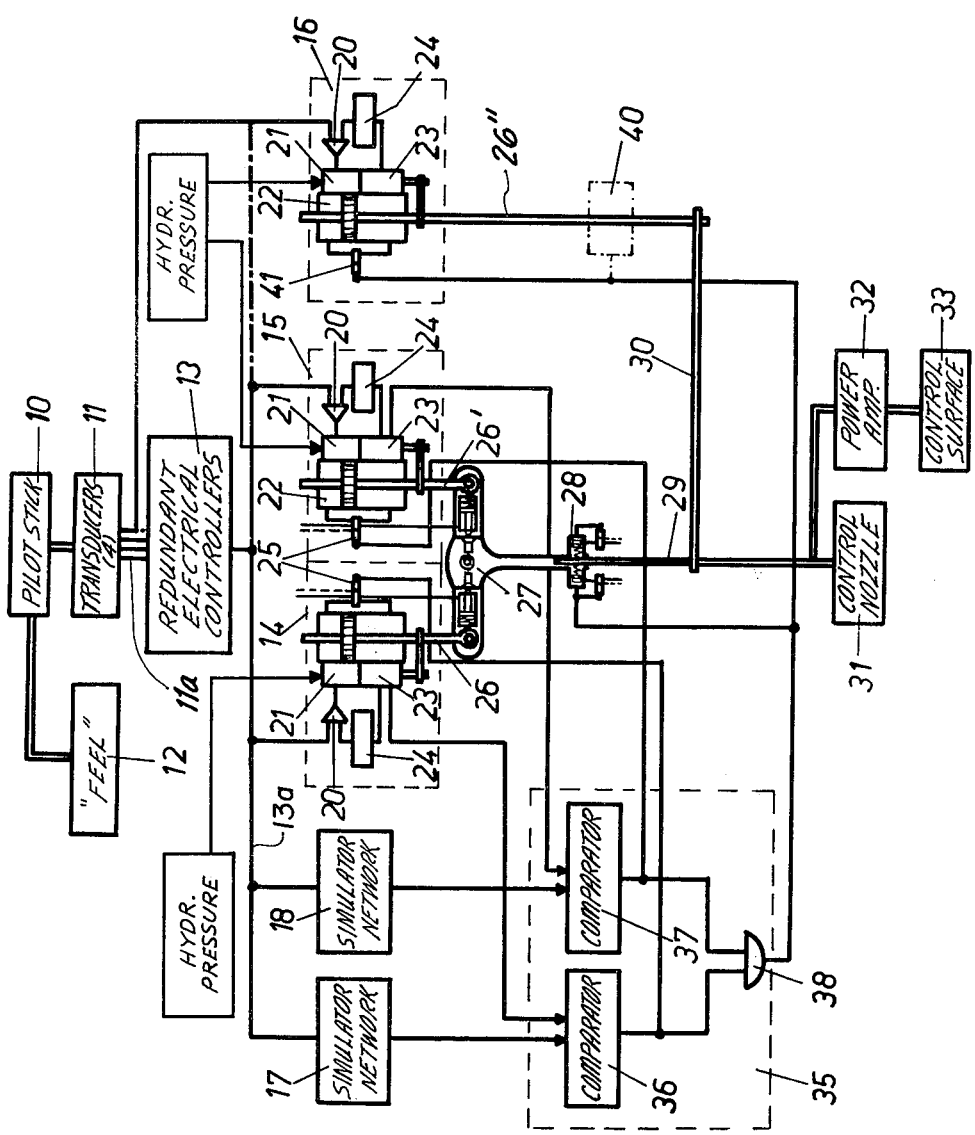

ELECTRO-HYDRAULIC ACTUATION SYSTEM WITH REDUNDANCY OPERATION, SUPERVISION AND EMERGENCY OPERATION

BACKGROUND OF THE INVENTION

The present invention relates to a system for supervisory control of a hydraulic actuator system which includes plural actuators operating in redundancy, and more particularly the invention relates to improvements in the operation of redundantly operating multiple pistoncylinder arrangements acting on a common load and each being controlled by servo valves and supervised by simulator operation.

In critical situations movable objects are frequently controlled through redundant actuators. For example, high performance aircraft are to be controlled at a high degree of accuracy combined with utmost reliability. For this, one has used actuators composed of at least two, hydraulically operated piston - cylinder arrangements, operating on a common load such as a control surface of the craft. Each of the piston - cylinder actuators is controlled by servo valves which receive electrical signals for control.

Plural, parallelly operating actuators require individual supervision of operational accuracy, which is carried out separately for each actuator, for example, by means of an on-line actuator or analog cooperating with a load-independently operating, electrical or hydraulical comparator. The comparator will indicate whether or not the respective, supervised actuator operates properly, and, if not, it can be disconnected so that the operation continues with the remaining actuator or actuators.

A duplex drive, composed of two actuators offers the lowest degree of redundancy, as in the case of drop out of one of them only one remains operative. Even if partially defective the remaining actuator would have to continue. In order to avoid this possibility one could, provide for a triple or quadruple etc systems, but having many independent actuators operate on a common output poses significant problems. Balanced operation must be achieved and retained even if one or several of the actuator units drop out.

Alternatively one can provide for a completely separate mechanical emergency control system which poses its own weight problems and others. A mechanical emergency control system offers difficulties concerning adjustment generally, as well as with regard to exchanging of components. Moreover, the emergency system requires its own supervision and testing concerning operability so that this approach has not really gained acceptance.

SUMMARY OF THE INVENTION

It is an object of the present invention to provide for a new and improved redundancy actuator system having at least two actuators which are supervised by means of on-line simulation, and which remains operative even if, apparently, both actuators have dropped out.

It is another object of the present invention to provide for a new and improved system by combining redundancy and emergency features in a manner avoiding drawbacks outlined above.

In accordance with the preferred embodiment of the invention it is suggested to supplement a redundancy system having several, independently operating actuators, supervision of each actuator by operational simulation and selective de-activation in case of drop out in that an additional, stand by, unsupervised actuator is operatively connected to an actuator output by the simulator - supervision arrangement when all on-line actuators have dropped out. The additional actuator receives its own electrical input command, and its output operation is not combined with the combined output displacements as provided by the system of actuators; rather, when the redundancy system has failed completely, the additional actuator takes over.

The inventive system has the advantage over a mechanical emergency system in that it is constructed with greater compatibility with the redundancy system as the additional actuator should be of the same kind as the individual actuators of the redundancy system. This way, the system as a whole is more readily integrated but the additional actuator is excluded from having to be balanced in relation to the others. Friction and undue slack is more readily avoided and the changeover from regular to emergency operation is smoother. Also, the utilization of an additional, hydraulically generated actuator is less of an additional load than mechanical linkage.

In the preferred form of practicing the invention, separate simulators and operational supervision is used or each actuator of the redundancy system. A separate comparator connected to these elements determines whether or not the respective actuator operates properly. If not, the comparator controls shut down of tha actuator. Such shut down signals when issued by al comparators are used as indication that the redundancy system has dropped out completely. That indication, in the form of a logic "and" signal is used to either turn the hydraulics of the additional actuator on, or the output rod of the hydraulic drive in the actuator is coupled to the device that is being actuated and was so actuated by the redundancy actuation system as long as at leas one actuator thereof was working. Both modes of star up of the effectiveness of the additional actuator can be used. In either case, the actuator is caused to operpate on a stand by basis prior to such start up in that it receives the input commands as applied to the redundancy system, without however carrying out the commands. That will take place only after shut down of al units in the redundancy system and after operationa start up as to output effectiveness of the additional ac tuator.

DESCRIPTION OF THE DRAWINGS

While the specification concludes with claims particularly pointing out and distinctly claiming the subjec matter which is regarded as the invention, it is belive that the invention, the objects and features of the in vention and further objects, features and advantage thereof will be better understood from the followin description taken in connection with the accompanyin drawings in which:

The FIGURE shows somewhat schematically a bloc diagram, partially detailed, of a system in accordanc with the preferred embodiment of the present inver tion.

Proceeding now to the detailed description of th drawings, reference numeral 10 refers to the contr stick or column as manipulated by the pilot of an ai craft. The control stick 10 controls directly a quadru plex transducer system, e.g. an assembly of four poter tiometers, each being adjusted in the same way so that four output lines 11a receive the same signals.

The deflection of the control stick or column 10 can be regarded as the input command for the control system while the individual signals in lines 11a constitute a first representation for the input command in the form of a four fold redundant command signal. Three of these four signals are fed to three flight control systems, all of them are included in box 13; the fourth one is used for the stand-by actuator as will be shown shortly.

The control stick 10 is additionally coupled to a device 12 which is being actuated also by the stick but reacts on the stick to simulate a reaction force as it would exist if the control stick would control directly a control surface or nozzle and would experience the external reaction on these controlled devices in a feedback effect. Device 12 simulates that reaction.

The command signals as received in three-fold redundancy by the control circuits 13 are processed therein separately, in three parallelly operating control circuits, including amplifiers, and possibly, inputs representing the position, location etc of the device to be controlled and/or the reaction of the craft to the command instituted by the system. The three control circuits arrive at three control signal independently and the signals are superimposed, summed or combined on the basis of the majority principle to arrive at a particular control signal fed to a bus 13a.

Two units, actuators 14 and 15, are connected to receive this control signal. These units together establish the redundant system of regular operation, wherein one takes over when the other one fails. Reference numeral 16 denotes a third actuator, not included in the redundancy system as established by actuators 14 and 15, and provided for reasons of stand-by. That actuator 16 may receive the output of the fourth potentiometer in transducer unit 11 as indicated. Alternatively, the output of the controller circuit 13 may be connected also to the electrical input of actuator 16. In the latter case the fourth potentiometer may also feed its signal into controller 13 and there may be provided a fourth control circuit for four-fold redundancy in the electric control.

Each of the individual actuators 14, 15, 16 has an amplifier 20, receiving the respective control signal, one taken from triple-controller 13 for actuators 14 and 15 and one from the fourth potentiometer for actuator 16. The amplifier 20 controls servo valve 21 for the respective cylinder 22 in an hydraulic drive as included in each actuator. Aside from the cylinder, the drive includes a piston with a piston rod 26, 26' which is the displaceable actuator output element for the respective actuator.

The disposition of the respective piston rod 26, 26' is monitored by a potentiometer 23 providing a feedback signal indicative of the advance or retraction of the piston rod. An impedance network 24 modifies the feedback signal for purposes of obtaining a feedback characteristic that meets the requirements particularly to the temporal behaviour of the actuator. That modified feedback signal is fed to one input of amplifier 20 to close the loop; the other input of amplifier 20 receives the control signal from controller 13 in representation of the input command.

The two piston rods 26, 26' of actuators 14 and 15 are connected to a two-arm swivel lever 27 whose pivot extends into an actuator rod which in turn is connected to an actuator rod 29 via a clutch 28. The piston rod 26" of actuator 16 is also connected to rod 29 via a traverse or cross-bar 30.

The piston rod 29 can be regarded as the displaceable output member of the actuator system as described.

Reference numeral 31 refers for example to the control nozzles of a VTOL aircraft which are being directionally adjusted by the actuator rod 29. Additionally or in the alternative the rod 29 may be coupled to the power-assist operated actuator 32 for a control surface 33 of the craft.

The control output signal of control apparatus 13 (bus 13a) is further fed to two simulators 17 and 18 which are, for example, non-linear networks responding to the control input and providing a signal which represents actuator operation in each instance. Each on-line simulator 17, 18 is an independently operating unit, respectively for duplicating the operation of the of the actuators and providing an output signal that should be the same as the signal provided by the respective feedback potentiometer 23 of the actuator, as that signal represents the disposition of the piston rod of that actuator.

The association of a particular simulator with an actuator is carried out in the following manner. A control circuit 35 supervises the redundancy operation of the two actuators 14 and 15, individually and jointly. The control circuit 35 includes two comparators 36 and 37 which respectively receive the on-line simulator signals from networks 17 and 18 as well as the outputs of the potentiometers 23 of actuators 14 and 15. Thus, comparator 36 compares the operational response of actuator 14 with the signal by means of which simulator 17 represents how actuator 36 is supposed to react to any control signal on bus 13a. Comparator 37 performs the same function for actuator 15 using simulator 18 as reference.

The comparators 36 and 37 have a particular response threshold in that the respective input signals may differ by up to a certain amount. Beyond that tolerance level the difference is deemed indicative of faulty operation, and the respective comparator, 36 or 37 gives off a control signal to a respective two position valve 25 which interconnects the respective piston chamber on opposite sides of the piston so that the piston can slide in the cylinder without resistance and does not act any longer on the control rod.

In addition, the hydraulic supply to the respective servo valve and cylinder should be interrupted, possibly through a separate valve because leakage may be responsible for the drop out. Furthermore the position of the swivel lever 27 is shifted into horizontal disposition and locked e.g. clamped to the swivel shaft so that further pivot motion is no longer possible. This is necessary because the one actuator still remaining operative acts on rod 29 via swivel lever 27 but off center with regard to the pivot point. However, the pivot point of swivel lever 27 must not act as fulcrum for transmission of lever action onto the other, now in-operative actuator. Thus, the remaining actuator moves the swivel lever 27, in the drawing up and down, and the locked horizontal disposition of two arm lever 27 prevents translation of actuator motion into a swivel and pivot motion of lever 27 so that rod 29 can, indeed, be operated by the one actuator alone.

Both comparators may provide control signals indicative of faulty actuator action. It is rather unlikely that both actuators of the redundancy system drop out simultaneously, but even after an actuator has been deactivated, its associated simulator continues to provide signals so that the respective comparator continues to provide the fault indicating signal. Alternatively, each unit 36, 37 may include a flip-flop output which is set to indicate response to faultiness of the respective actuator and that indication remains independent of subsequent development of the signals on the inputs of the respective comparator.

As soon as both comparators provide a fault indicating signal, the respective other actuator is also deactivated. Thus, swivel 27 no longer receives any actuating displacement. An "and" gate 38 reponds to the complete drop out of the redundancy system because all comparators signal failure in such a case.

The output signal of "and" gate 38 is fed to clutch 28 as a disconnect signal, thus separating the rod 29 from the two actuators 14, 15 mechanically. Additionally, the output signal of "and" gate is fed to the two position two way valve 41 of actuator 16 for turning this actuator on. A clutch 40 may be provided in addition or in lieu of valve 41 to operatively connect the piston rod of actuator 16 to actuator rod 29. Thus, in either case there is now established operative connection of standby actuator 16 to the common actuator output member 29, while the redundancy system is disconnected therefrom.

During operation, the control stick 10 is always manipulated by the pilot. The deflection is translated into a four fold redundant electrical signal by the potentiometer unit 11. Three of these signals are fed to the three controllers in unit 13 which controls the two actuators 14 and 15. The two-fold redundant actuator system is supervised, each actuator individually, through simulation of the control stick effects and comparing them with the actual displacement as produced by the respective actuator. The comparators 36 and 37 provide signal representation as to whether or not an actuator follows the prescribed operational characteristics.

This part then constitutes a primary system with electrically-controlled -three fold redundancy and electromechanical electromechanically controlled two-fold redundancy, linked through a common control bus 13a. The fourth potentiometer feeds its signal to the third actuator 16, and may provide electrical control thereto which however remains ineffective, because the valve 41 de-activates the hydraulic part of the actuator. Alternatively the actuator 16 may run continuously, but remain disconnected from the actuator output through disengaged clutch 40. This part of the system is, therefor, a direct connection, with electro-hydraulic power assist, running from the control stick to the actuator output member rod 29, and constitutes an emergency actuation link.

The primary system, when operative in full, operates swivel 27 which moves control rod 29. If the clutch 40 is not provided, the piston in cylinder 22 of actuator 16 runs idly along but completely independently from the redundancy system, merely on a stand-by basis. The same holds true if one or the other of the actuators 14 and 15 drops out. In such a case the respective valve 25 is connected for by-pass operation. Additionally, the respective valve 25 provides position arrest of swivel 27 as far as any pivot action is concerned; but the redundant system still provides for the actuation.

In the case of double drop out in the actuator system, the primary system is disconnected from rod 29 by clutch 28, while both actuators 14 and 15 are deactivated. The swivel lever 27 remains arrested in straight position. Both pistons of actuators 14 and 15 could run idly, but disconnection by clutch 28 is preferred for reasons of load relief. Actuator 16 starts up and/or is connected to actuator rod 29 and the pilot's control motion is now directly transmitted, in open loop control via the fourth potentiometer in unit 11 and actuator 16. If the signal on bus 13a is used as input for the stand by actuator some feedback may be included in that control path. The connection between the fourth potentiometer of unit 11, and actuator 16 may be provided in addition, also on a stand-by basis to take over in the case of a complete drop out of the electrical control system 13.

It should be mentioned, that the two actuators 14 and 15 are preferably provided with hydraulic pressure fluid through separate sources. One or the other of these sources, however, may serve additionally for supplying hydraulic pressure to actuator 16, because that supply is needed only when that particular hydraulic supply source does not have to feed the actuator regularly supplied by it. This way, power assist operation by actuator 16 is ensured even if the normal hydraulic system has dropped out. By way of example, one of the actuators 14 or 15 may be operated by the regular hydraulic system which provides hydraulic fluid to various parts of the aircraft, while the other one of the redundancy system as well as stand-by actuator 16 receive hydraulic fluid from the emergency source for hydraulic pressure.

The invention is not limited to the embodiments described above but all changes and modifications thereof not constituting departures from the spirit and scope of the invention are intended to be included.

We claim:

1. A control system with redundant actuator operation, comprising:
    a plurality of individual actuators, each including a hydraulic drive with servo valve control, electrical input for control of the valve, and a displaceable output device being displaced in response to actuator operation;
    means including a common output device connected to all of said output devices for providing a common actuator output as displacement of the common output device;
    means connected for providing control signals to the actuators of the plurality of individual actuators to obtain combined operation of them for displacing said common output device;
    an additional actuator not included in the plurality of individual actuators and having a hydraulic drive electrical input for control of the hydraulic drive and a displaceable output device, the input being operatively connected to receive control signal from the means of providing, the additional actuator being normally operatively disconnected from the common output device;
    a plurality of means respectively for deriving from each actuator a signal representing the operation of the actuator in response to the control signal it receives;

means connected to receive also the control signal and constructed for simulating operation of the actuators and providing output signals representative thereof; and supervising means connected to the means for simulating and to the plurality of means for deriving to provide a second control signal in representation of a complete drop out of all actuators of the plurality, for causing said additional actuator to be operatively connected to said output device.

2. A control system as in claim 1, wherein the supervising means includes a plurality of individual comparators respectively connected each to receive an output signal from the means for simulating and one of the signals as provided by one of the plurality of means for deriving, the supervising means further including circuit means connected to all of the comparators to respond to output signals from the comparators for the production of the second control signals, when all comparators provide output signals representative of drop out respectively of all the actuators of the plurality.

3. A control system as in claim 1, wherein the comparators individually signalling drop out of the respective actuator are connected to control means for de-activating the respective actuator.

4. A control system as in claim 1, wherein the additional actuator receives control signals on a continuous basis, but being hydraulically de-activated as to hydraulic operation, the supervising means activating the additional actuator as to hydraulic operation thereof to obtain the operative connection to the output device in the case of drop out of all actuators of the plurality.

5. A control system as in claim 1, wherein the additional actuator receives control signals on a continuous basis and providing for operational displacement of its displaceable output, the displaceable output being normally decoupled from the output device, the supervising means coupling the displaceable output to the output device for obtaining the operative connection thereto in the case of drop out of all actuators of the plurality.

6. A control system as in claim 1, wherein a separate supply is provided as emergency source for hydraulic fluid, the additional actuator receiving hydraulic fluid from said source.

* * * * *